(12) United States Patent
Hembram et al.

(10) Patent No.: US 10,133,615 B2
(45) Date of Patent: Nov. 20, 2018

(54) LONG-RUNNING STORAGE MANAGEABILITY OPERATION MANAGEMENT

(71) Applicant: Microsoft Technology Licensing, LLC, Redmond, WA (US)

(72) Inventors: Shyama Prasad Hembram, Bothell, WA (US); Gustavo Rafael Franco, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 15/071,143

(22) Filed: Mar. 15, 2016

(65) Prior Publication Data

US 2017/0168887 A1    Jun. 15, 2017

Related U.S. Application Data

(60) Provisional application No. 62/267,813, filed on Dec. 15, 2015.

(51) Int. Cl.
| | |
|---|---|
| *G06F 11/00* | (2006.01) |
| *G06F 11/07* | (2006.01) |
| *G06F 9/50* | (2006.01) |
| *G06F 9/54* | (2006.01) |
| *H04L 29/08* | (2006.01) |

(52) U.S. Cl.
CPC ........ *G06F 11/0757* (2013.01); *G06F 9/5072* (2013.01); *G06F 9/546* (2013.01); *G06F 11/0772* (2013.01); *H04L 67/142* (2013.01)

(58) Field of Classification Search
CPC .................................................. G06F 11/0757
USPC ............................... 714/37, 38.1, 4.1, 15, 46
See application file for complete search history.

(56) References Cited

U.S. PATENT DOCUMENTS

| | | | |
|---|---|---|---|
| 6,145,094 A | 11/2000 | Shirriff et al. | |
| 7,475,089 B1 | 1/2009 | Geddes | |
| 8,069,147 B2 * | 11/2011 | Blazejewski | ..... G06F 17/30569 |
| | | | 707/640 |
| 8,700,786 B2 | 4/2014 | Chong et al. | |
| 8,938,770 B2 | 1/2015 | Mathews et al. | |
| 9,009,253 B2 | 4/2015 | Chandrasekhar et al. | |

(Continued)

FOREIGN PATENT DOCUMENTS

WO    2012027638    3/2012

OTHER PUBLICATIONS

International Search Report and the Written Opinion issued in PCT Application No. PCT/US2016/065473 dated Mar. 10, 2017.

(Continued)

*Primary Examiner* — Dieu Minh T Le
(74) *Attorney, Agent, or Firm* — Workman Nydegger

(57) ABSTRACT

Serving resources. A method includes receiving from a client, a request for one or more operations to be performed. The method further includes attempting to perform the one or more operations. The method further includes determining that the one or more operations are not complete at a present time. As a result, the method further includes sending a message to the client indicating that the client should attempt to obtain status information for the one or more operations at a predetermined later time. The method further includes receiving a request from the client for status information about the one or more operations. The method further includes repeating sending a message to the client and receiving a request from the client for status information.

20 Claims, 3 Drawing Sheets

(56) References Cited

U.S. PATENT DOCUMENTS

| | | | |
|---|---|---|---|
| 2003/0229677 A1* | 12/2003 | Allan | G06F 17/30887 709/217 |
| 2005/0266160 A1* | 12/2005 | Bond | C03C 17/36 427/164 |
| 2006/0010426 A1* | 1/2006 | Lewis | G06F 11/3684 717/124 |
| 2007/0266160 A1* | 11/2007 | Johnson | G06F 17/30864 709/226 |
| 2011/0099482 A1* | 4/2011 | Koved | G06F 21/604 715/741 |
| 2012/0209945 A1* | 8/2012 | Chandrasekhar | H04L 12/66 709/217 |
| 2012/0324414 A1* | 12/2012 | Tzoref-Brill | G01R 31/318371 716/136 |
| 2014/0181826 A1 | 6/2014 | Wolf et al. | |
| 2015/0089041 A1 | 3/2015 | Mehta et al. | |
| 2015/0205634 A1 | 7/2015 | McPherson et al. | |

OTHER PUBLICATIONS

Tsai, et al., "Network service connection management mechanism and network service platform", In Proceedings of IEEE International Conference on Mechatronics and Automation, Aug. 4, 2013, pp. 1599-1604.

Second Written Opinion issued in PCT Application No. PCT/US2016/065473 dated Jul. 26, 2017.

"Second Written Opinion Issued in PCT Application No. PCT/US2016/065473", dated Jul. 26, 2017, 4 Pages.

"International Preliminary Report on Patentability issued in PCT Application No. PCT/US2016/065473," dated Oct. 4, 2017.

\* cited by examiner

LONG-RUNNING STORAGE MANAGEABILITY OPERATION MANAGEMENT

CROSS-REFERENCE TO RELATED APPLICATIONS

This application claims the benefit of and priority to U.S. Provisional Patent Application Ser. No. 62/267813 filed on Dec. 15, 2015 and entitled "Long-Running Storage Manageability Operation Management in the Face of Fabric and Management Orchestrator Failures," which application is expressly incorporated herein by reference in its entirety.

BACKGROUND

Computers and computing systems have affected nearly every aspect of modern living. Computers are generally involved in work, recreation, healthcare, transportation, entertainment, household management, etc.

Computing systems can be networked together. Often, different specialized computing systems can provide various services to other computing systems. For example, a client system may be able to access various server systems to utilize resources at those server systems. Such systems may be able to provide, for example, compute resources, network resources, and/or storage resources. In some embodiments, such resources can be provided in so-called cloud based systems, where services are provided by any one of a number of different managed servers working in concert to provide resources to clients. Storage related operations are often asynchronous in nature with respect to client/server interaction and thus there is a need for asynchronous client/server communication with respect to storage resources. However, this can result in problems when a storage server has a difficult time performing certain storage operations, as a client may not have any information about the progress (including failure) of a storage operation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for se resources. The method includes receiving from a client, a request for one or more operations to be performed. The method further includes attempting to perform the one or more operations. The method further includes determining that the one or more operations are not complete at a present time. As a result, the method further includes sending a message to the client indicating that the client should attempt to obtain status information for the one or more operations at a predetermined later time. The method further includes receiving a request from the client for status information about the one or more operations. The method further includes repeating sending a message to the client indicating that the client should attempt to obtain status information for the one or more operations at a predetermined later time and receiving a request from the client for status information about the one or more operations until the one or more operations are complete, after which completion status is provided to the client or until a predetermined number of retries has been attempted, after which, failure is indicated to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
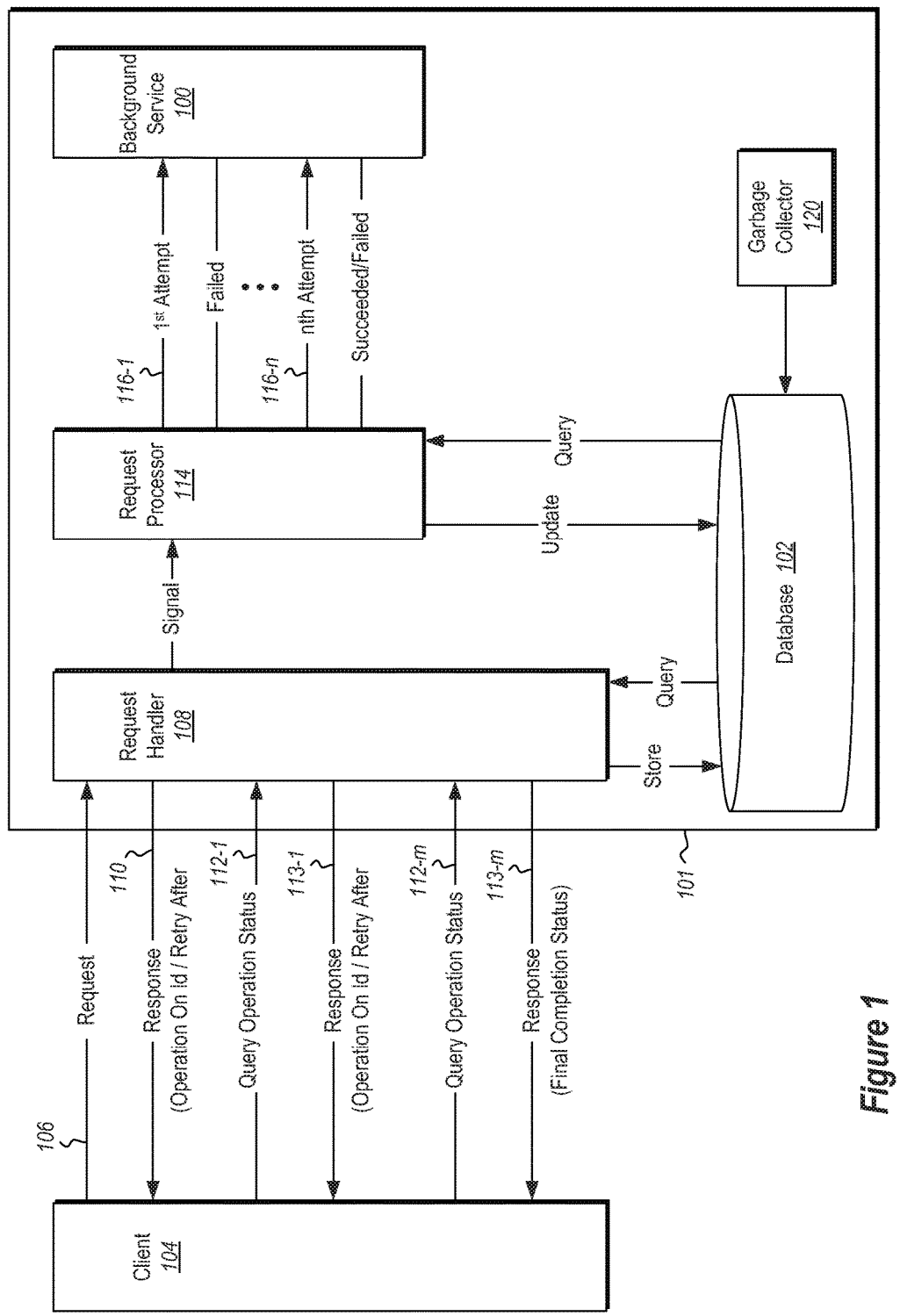
FIG. 1 illustrates a system for serving resources to client systems.

Embodiments illustrated herein may implement stateless operations management based on a stateful highly-available shared database, using a distributed system of management orchestrators that may incur random failures during long-running operations.

One or more embodiments illustrated herein are directed to systems that can be implemented in cloud environments. Such systems are configured to handle errors (especially transient errors) to maintain a low operation failure rate. Further, embodiments may be stateless to be able to scale out and still handle long running operations. Data/operation state is persisted so that the long running operations can be completed at a later point. Due to the asynchronous nature of operation handling in such systems, embodiments implement a store where operation state is persisted and an operation manager can schedule operations, retry operations and move operations to a terminal state.

An example is now illustrated with reference to FIG. 1. Storage related operations are often asynchronous in nature and thus systems may implement asynchronous client/server communication. A stateless service 100 coupled with a datastore 102 is used to track operation states and retry operations in case of failure or service crash. The datastore 102 itself has high availability to reduce the impact of planned or unplanned downtime on the service. The datastore 102 also supports transactional semantics so that the service can be scaled out to handle high traffic.

In the illustrated example, a client 104 makes a request as illustrated at 106 to a request handler 108 of a server 101 and then polls the server 101 as illustrated at 112-1 and 112-m for operation status. The server 101 saves the operation details in a datastore 102 and sends a unique operation id to the client as illustrated at 110. The client 104 then uses the operation id to query the server 101 (by querying the request handler 108) periodically as illustrated at 112-1 and 112-m for the status. The server can respond as illustrated at 113-1 and 113-m indicating that the client 104 should query the server 101 at a later time or indicating a final completion status. The response includes an operation ID and an indication of a time after which the client 104 should query again, or as illustrated at 113-m, a final completion status, such as completed or failed.

Meanwhile, the server 101, using the request processor 114 and the service 100 attempts the operation one or more times up to a configured maximum retry count (as illustrated at 116-1 through 116-n) and stores the operation result in the datastore 102. When the client 104 requests operation status, as illustrated at 112-1 through 112-m, the request handler 108 returns the stored operation state as illustrated at 113-1 through 113-m. If the client 104 queries the status, before the operation has completed successfully and before all the retry attempts up to the maximum retry count are exhausted, the server sends back a unique status to the client 104 indicating the operation is in progress. If all the retry attempts are exhausted at the service 100 then the server sends back a failure status code to the client 104 along with error information.

In some embodiments, the server 101 can indicate to the client 104 when the client 104 should retry a query. For example, the server 101 may have some setting at the server that can be provided to the client 104 to indicate when a retry should be attempted by the client 104. The setting could be preset, administrator configurable, dynamically determined, etc.

Illustrating now various additional examples, the time indicated to a client to retry a query could be based on server capabilities. For example, when a server has higher capabilities, then the retry time may be lower than when a server has lower capabilities. Such capabilities may be related to compute capabilities, storage capabilities, network capabilities, etc. Such capabilities could be related to server configured capabilities. For example, a server with more virtual machines may specify a lower retry time to the client 104 than a server with less virtual machines. A server with more request handlers and/or request processors may specify a lower retry time to the client 104 than a server with less request handlers and/or request processors. The time indicated to the client may be based on server load. In particular, if a server is currently experiencing high load, a longer time may be indicated than when the server is experiencing lower load. The time indicated to the client may be based on time of day, time of week, time of year, seasons, etc. For example, certain times may be typically higher load for servers than other times. When the server anticipates a high load time (or low load time), the server can adjust the specified time when a retry from the client should be attempted accordingly. The time indicated to the client may be based on server errors. For example, if a server is currently in an error state, a longer time may be indicated to the client. The time may be adjusted depending on the type of error and/or anticipated resolution time for the error.

The maximum retry count may be variable and system and/or condition dependent. For example, if the server 101 is expected to have a higher than usual load, the server 101 could adjust the maximum retry count lower to try to reduce the load on the server. Alternatively, the server could adjust the retry count higher if the server has additional resources made available and retries will have little or no effect on the server's ability to service other clients.

As illustrated in FIG. 1, the server 101 also has a garbage collector 120 to cleanup operations that have either been completed or have reached the maximum retry count.

Illustrating now additional details, the request handler 108 is a stateless service that does one or more of the following actions:

A) Accepts requests and validates the requests and their parameters.

B) Saves the context in the datastore 102 so that the operations can be replayed and/or retried without the client 104 (or other external app connecting to the service) explicitly retrying.

C) Signals the request processor 114 to indicate new operations.

D) Queries the datastore 102 for the status of operations and returns the status back to the client 104 when the client 104 asks for it.

The request processor 114:

A) Periodically polls for operations that are eligible to run. In some embodiments, eligible operations are those that satisfy one of the following conditions.

i) New operations that have not been attempted.

ii) Failed operations that have not exceeded a maximum retry count.

iii) Operations that are in progress but the request processor 114 has crashed midway and has a last modification time that is older than a configured maximum.

B) Waits for a signal from the request handler 108 for new operations.

C) Attempts the operation up to a configured maximum retry count.

D) Stores operation state in the datastore 102.

E) If the operation takes too long, updates the last modified time for the operation so that other request processors do not pick up this operation in a scale out deployment.

The following now illustrates details with respect to scale out and conflict resolution. Request handlers 108 and request processors 114 are designed for scale out to handle growing traffic needs. As such, embodiments may implement a datastore 102 that supports atomic transactions to resolve situations where two or more request handlers pick the same operation to process.

For example, in some embodiments, the datastore 102 may be used with optimistic concurrency control schemes. In optimistic concurrency control, processing proceeds assuming that different request handlers and/or different request processors will not perform conflicting operations on data in the datastore 102. Thus, locks on data are typically not acquired. At some point in the processing, the system will want to commit or make durable any changes to data in the datastore 102. At this point, various flags or other markers can be used to determine if conflicting operations (e.g., reads and/or writes) from different request handlers and/or request processors have occurred. If conflicts have occurred, then operations can be rolled back and retried. In some embodiments, such retries may count against the configured maximum retry number described above, whereas in other embodiments, transactional rollback and retries will not be counted against the configured maximum retry number.

Alternatively, embodiments may implement pessimistic (or semi-pessimistic) concurrency control at the datastore 102. In pessimistic concurrency control, a request handler or request processor can block (e.g., by taking out a lock) other request handlers and/or request processors from accessing certain data items in the datastore 102 such that while the request handler or request processor is operating on those data items, other request handlers and/or request processors will not perform conflicting data operations.

The following now illustrates details with respect to crash-consistency. Embodiments can support scenarios where the request processor 114 picked up an operation to process but crashed midway without updating the operation state. Embodiments can ensure that the operation always runs to completion. To achieve this, the operation context has a last modified time property which is updated by the request processor 114. If the request processer 114 encounters an operation that is marked 'in progress' but the last modified time is older than a configurable threshold it will assume that a previous instance of the request processor has abandoned the operation midway, e.g., due to a possible crash. The current instance of the request processor picks the operation and attempts to perform the operation again if the retry count of the operation has not reached the maximum retry count.

Various client extensions can be implemented. For example, in some embodiments, clients can optionally include some metadata in the payload of a request to indicate a custom retry count. Thus, rather than being limited to the maximum retry count implemented at the service, a client can indicate the number of retries that should be attempted before abandoning an operation. In some embodiments, the number of retries specified by the client may be constrained to only be valid within an allowed range. Thus, in these embodiments, while a client may be able to specify a number of retries, they would still be limited within some threshold.

In some embodiments, an extension may tell the request handler 108 to abort an operation if it is taking too long and stop retrying if the operation has not reached its maximum retry count.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
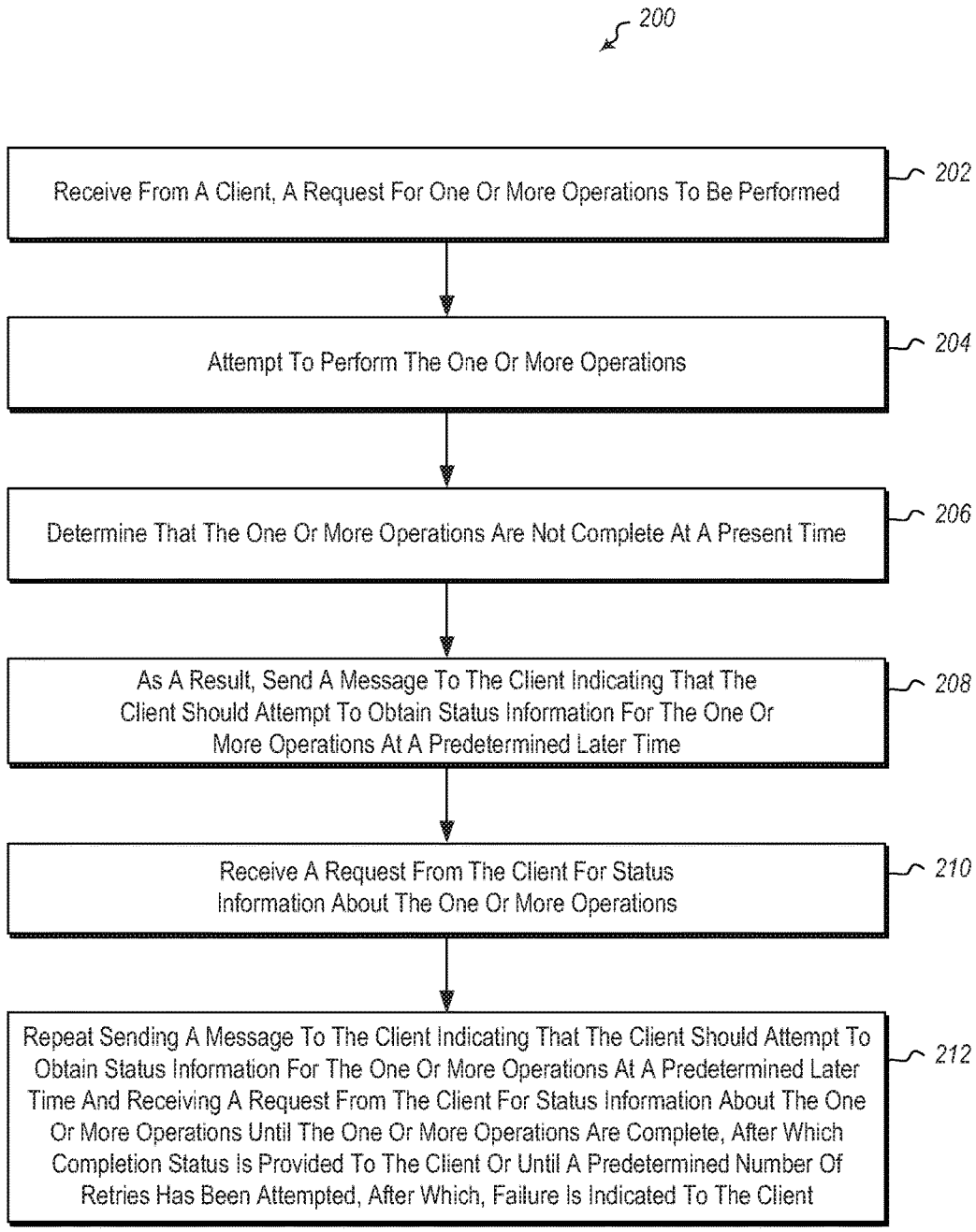
FIG. 2 illustrates a method of serving resources.

Referring now to FIG. 2, a method 200 is illustrated. The method 200 may be practiced in a computing environment and includes acts for serving resources. The method includes receiving from a client, a request for one or more operations to be performed (act 202). For example, as illustrated in FIG. 1, at 106 a request is received from a client 104 for operations to be performed by the server 101.

The method 200 further includes attempting to perform the one or more operations (act 204). For example, the server 101 may attempt to have the service 100 perform the operations.

The method 200 further includes determining that the one or more operations are not complete at a present time (act 206). For example, the request handler 108 can examine data state at the datastore 102 to determine if operations are complete.

As a result, the method 200 further includes sending a message to the client indicating that the client should attempt to obtain status information for the one or more operations at a predetermined later time (act 208). For example, as illustrated at 110, the request handler 108 may indicate that the operation is not yet complete.

The method 200 further includes receiving a request from the client for status information about the one or more operations (act 210). For example, as illustrated at 112-1, the server 101 may receive a request from the client 104 for status information.

The method 200 further includes repeating sending a message to the client indicating that the client should attempt to obtain status information for the one or more operations at a predetermined later time and receiving a request from the client for status information about the one or more operations until the one or more operations are complete, after which completion status is provided to the client or until a predetermined number of retries has been attempted, after which, failure is indicated to the client (act 212).

The method 200 may further include receiving from the client an indication of a number of retries that should be attempted. For example, the server 101 can receive information from the client 104 itself that specifies the number of retries attempted by the background service 100.

The method 200 may be practiced where sending a message to the client indicating that the client should attempt to obtain status information for the one or more operations at a predetermined later time comprises sending a URI to the client that the client should use for one or more subsequent status requests by the client. In some embodiments, a same URI is sent to the client each time a message is sent to the client indicating that the client should attempt to obtain status information for the one or more operations at a predetermined later time. Alternatively or additionally, a different URI is sent to the client each time a message is sent to the client indicating that the client should attempt to obtain status information for the one or more operations at a predetermined later time.

The method 200 may further include receiving from the client an indication that no more retries should be attempted. For example, the client 104 may indicate after one or more of the queries, such as those illustrated at 112-1 through 112-m that the server 101 should no longer perform additional attempts to perform the operations.

Figure 3:
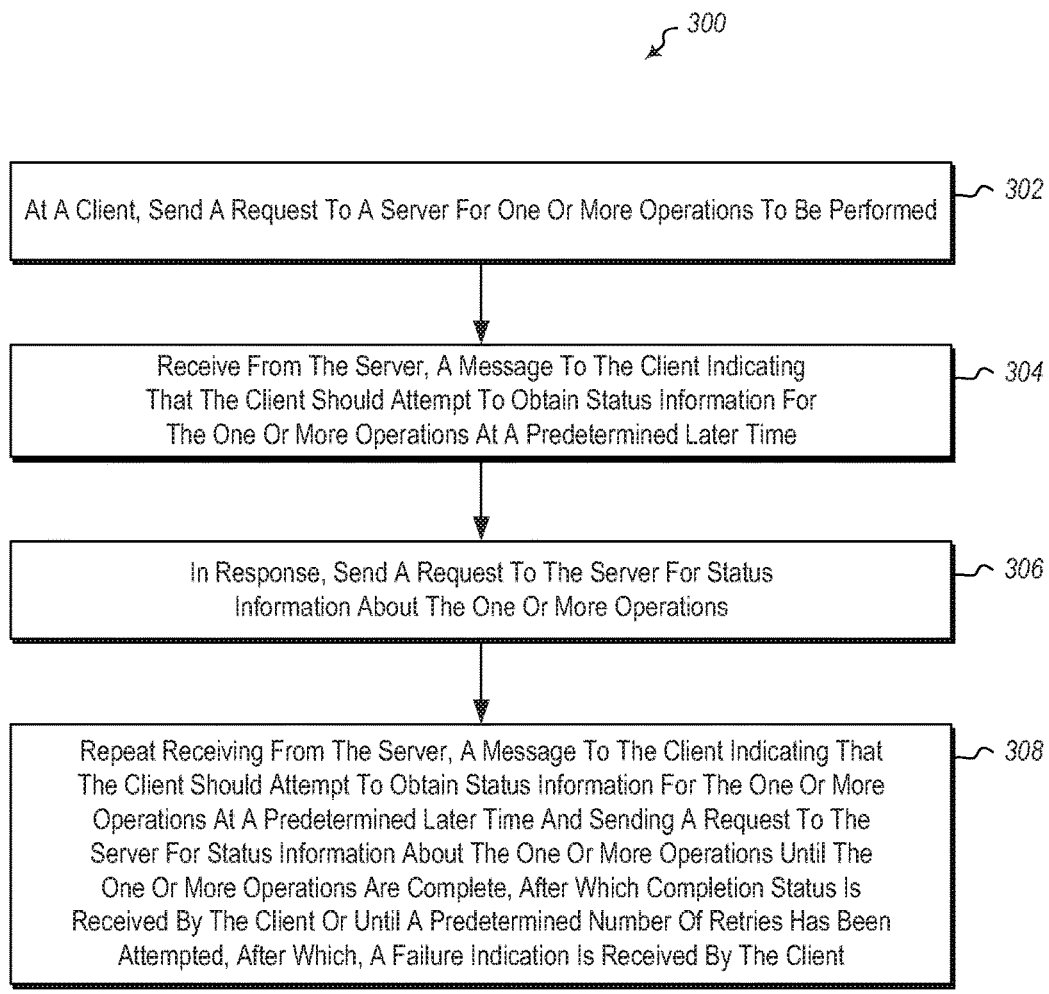
FIG. 3 illustrates a method of obtaining resources.

Referring now to FIG. 3, a method 300 is illustrated. The method may be practiced in a computing environment, and includes acts for obtaining resources. The method 300 includes, at a client, sending a request to a server for one or more operations to be performed (act 302). For example, as illustrated at 106 in FIG. 1, the client 104 may send a request to the server 101.

The method 300 further includes receiving from the server, a message to the client indicating that the client should attempt to obtain status information for the one or more operations at a predetermined later time (act 304). For example, as illustrated at 110, the client 104 may receive from the server 101 an indication that the client should query after a later specified time for status information on the plurality of operations.

In response, the method 300 further includes sending a request to the server for status information about the one or more operations (act 306). For example, as illustrated at 112-1, the client 104 can query the server 101 for operation status.

The method 300 further includes repeating receiving from the server, message to the client indicating that the client should attempt to obtain status information for the one or more operations at a predetermined later time and sending a request to the server for status information about the one or more operations until the one or more operations are complete, after which completion status is received by the client or until a predetermined number of retries has been attempted, after which, a failure indication is received by the client (act 308). For example, as illustrated at 112-1 through 112-*m* and 113-1 through 113-*m*, the client and continue to send requests for status and receive responses until a final completion status is provided at 113-*m*.

The method 300 may further include sending to the server an indication of a number of retries that should be attempted. For example, the client 104 can indicate to the server 101 the number of times that the operations should be retried by the request processor 114 and the background service 100.

The method 300 may be practiced where receiving from the server, a message to the client indicating that the client should attempt to obtain status information for the one or more operations at a predetermined later time comprises receiving a URI that the client should use for one or more subsequent status information requests. For example, a same URI for a status query is received by the client each time the client receives from the server, a message to the client indicating that the client should attempt to obtain status information for the one or more operations at a predetermined later time. Alternatively or additionally, a different URI for a status query is received by the client each time the client receives from the server, a message to the client indicating that the client should attempt to obtain status information for the one or more operations at a predetermined later time.

The method 300 may further include the client sending an indication that no more retries should be attempted. For example, the client may indicate that it wishes for no more retries of the operations to be attempted by the request processor 114 and the background service 100

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A stateless system, configured to scale out and handle long running operations with a low operation failure rate, the system comprising:
one or more processors; and
one or more physical computer-readable storage media having stored thereon instructions that are executable by the one or more processors to configure the one or more processors to serve resources, including instructions that are executable to configure the one or more processors to perform at least the following
receiving from a client, a request for one or more asynchronous read/write operations to be performed on a datastore;
attempting to perform the one or more asynchronous read/write operations on the datastore;
determining that the one or more asynchronous read/write operations are not complete at a present time on the datastore;
as a result, sending a message to the client indicating that the client should attempt to obtain status information for the one or more asynchronous read/write operations on the datastore at a predetermined later time, including sending a unique operation id to the client identifying the one or more asynchronous read/write operations;
receiving a request from the client for status information about the one or more asynchronous, read/write, storage operations on the datastore, the request for status information comprising the unique operation id; and
repeating:
sending a message to the client indicating that the one or more asynchronous read/write operations are in progress and that the client should attempt to obtain status information for the one or more asynchronous read/write operations on the datastore at a predetermined later time;
receiving a request from the client for status information about the one or more operations until the one or more asynchronous read/write operations are complete, after which, indicating that the asynchronous read/write operations have been completed on the datastore or until a predetermined number of retries has been attempted, after which, failure is indicated to the client.

2. The system of claim 1, wherein the one or more computer-readable storage media further have stored thereon instructions that are executable by the one or more processors to configure the one or more processors to receive from the client an indication of a number of retries of the one or more asynchronous read/write operations that should be attempted on the datastore.

3. The system of claim 1, wherein sending a message to the client indicating that the client should attempt to obtain status information for the one or more operations at a predetermined later time comprises sending a URI to the client, including the unique operation ID, that the client should use for one or more subsequent status requests by the client.

4. The system of claim 3, wherein sending a message to the client indicating that the client should attempt to obtain status information for the one or more operations at a predetermined later time comprises sending a same URI to the client each time a message is sent to the client indicating that the client should attempt to obtain status information for the one or more operations at a predetermined later time.

5. The system of claim 3, wherein sending a message to the client indicating that the client should attempt to obtain status information for the one or more operations at a predetermined later time comprises sending a different URI to the client each time a message is sent to the client indicating that the client should attempt to obtain status information for the one or more operations at a predetermined later time.

6. The system of claim 1, wherein the one or more computer-readable storage media further have stored thereon instructions that are executable by the one or more processors to configure the one or more processors to receive from the client an indication that no more retries should be attempted.

7. The system of claim 1, wherein the one or more computer-readable storage media further have stored thereon instructions that are executable by the one or more processors to configure the one or more processors to save operation context to a datastore such that operations can be replayed or retried without the client explicitly retrying the operations.

8. The system of claim 1, wherein the one or more computer-readable storage media further have stored thereon instructions that are executable by the one or more processors to configure the computer system to poll for operations that are eligible to run.

9. The system of claim 1, wherein attempting to perform the one or more operations is performed transactionally.

10. In a computing environment, a system for obtaining resources in a manner that facilitates long running operations with a low operation failure rate, the system comprising:
one or more processors; and
one or more physical computer-readable storage media having stored thereon instructions that are executable by the one or more processors to configure the one or more processors to obtain resources, including instructions that are executable to configure the one or more processors to perform at least the following:
at a client, sending a request to a server for one or more asynchronous read/write operations to be performed on a datastore;
receiving from the server, a message to the client indicating that the one or more asynchronous read/write operations are in progress and that the client should attempt to obtain status information for the one or more asynchronous read/write operations to determine the status of the one or more asynchronous read/write operations at a predetermined later time, the message including a unique operation id identifying the one or more asynchronous read/write operations;
in response, sending a request to the server for status information about the one or more asynchronous read/write operations on the datastore, the request for status information comprising the unique operation id; and
repeating receiving from the server, a message to the client indicating that the client should attempt to obtain status information for the one or more asynchronous read/write operations at a predetermined later time and sending a request to the server for status information about the one or more asynchronous read/write operations until the one or more asynchronous read/write operations are complete, after which completion status is received by the client or until a predetermined number of retries has been attempted, after which, failure is indicated to the client.

11. The system of claim 10, wherein the one or more computer-readable storage media further have stored thereon instructions that are executable by the one or more processors to configure the one or more processors to send to the server an indication of a number of retries of the one or more asynchronous read/write operations that should be attempted on the datastore.

12. The system of claim 10, wherein receiving from the server, a message to the client indicating that the client should attempt to obtain status information for the one or more operations at a predetermined later time comprises receiving a URI, including the unique operation ID, that the client should use for one or more subsequent status information requests.

13. The system of claim 12, wherein a same URI for the resources is received by the client each time the client receives from the server, a message to the client indicating that the client should attempt to obtain status information for the one or more operations at a predetermined later time.

14. The system of claim 12, wherein a different URI for the resources is received by the client each time the client receives from the server, a message to the client indicating that the client should attempt to obtain status information for the one or more operations at a predetermined later time.

15. The system of claim 10, wherein the one or more computer-readable storage media further have stored thereon instructions that are executable by the one or more processors to configure the one or more processors to send an indication that no more retries should be attempted.

16. A stateless system, configured to scale out and handle long running operations with a low operation failure rate, the system comprising:
one or more physical processors; and
one or more physical computer-readable storage media;
wherein the one or more computer-readable storage media have stored thereon instructions that are executable by the one or more processors to configure the one or more processors to implement a request handler configured to receive from a client, a request for one or more asynchronous read/write operations to be performed on a datastore;
wherein the one or more computer readable storage media have stored thereon instructions that are executable by the one or more processors to configure the one or more processors to implement a background service configured to perform the one or more asynchronous read/write operations on the datastore;
wherein the request handler is further configured to determine that the one or more asynchronous read/write operations on the datastore are not complete; and
wherein the request handler is further configured to repeatedly send a message to the client indicating that the client should attempt to obtain status information for the one or more asynchronous read/write operations on the datastore at a predetermined later time, including sending a unique operation id to the client identifying the one or more asynchronous read/write operations until the one or more asynchronous read/write operations are complete, after which, the request handle is configured to indicate that the asynchronous read/write operations have been completed on the datastore or until a predetermined number of retries has been attempted, after which, failure is indicated to the client.

17. The system of claim 16, wherein the one or more computer readable storage media have stored thereon instructions that are executable by the one or more processors to configure the one or more processors to implement a datastore configured to store asynchronous read/write operation details.

18. The system of claim 17, wherein the datastore supports transactional semantics.

19. The system of claim 16, wherein the one or more computer readable storage media have stored thereon instructions that are executable by the one or more processors to configure the one or more processors to implement a garbage collector configured to cleanup asynchronous read/write operations that have either been completed or have reached a maximum retry count.

20. The system of claim 16, wherein the system is configured to scale by supporting adding additional request handlers.

* * * * *